SYMBOL GENERATOR USING APERTURE CARDS

Filed Sept. 5, 1967 3 Sheets-Sheet 1

RICHARD R. COUNCILMAN
ROBERT N. MILLER,
INVENTORS

BY Charles W. McHugh
AGENT

SYMBOL GENERATOR USING APERTURE CARDS

Filed Sept. 5, 1967 3 Sheets-Sheet 2

RICHARD R. COUNCILMAN
ROBERT N. MILLER,
INVENTORS

BY Charles W. McHugh
AGENT

SYMBOL GENERATOR USING APERTURE CARDS

Filed Sept. 5, 1967 3 Sheets-Sheet 3

RICHARD R COUNCILMAN
ROBERT N. MILLER,
INVENTORS
BY [signature]
AGENT

United States Patent Office 3,524,987

Patented Aug. 18, 1970

3,524,987

SYMBOL GENERATOR USING APERTURE CARDS

Richard R. Councilman, O'Fallon, Mo., and Robert N. Miller, Dallas, Tex., assignors to LTV Electrosystems, Inc., Greenville, Tex., a corporation of Delaware Filed Sept. 5, 1967, Ser. No. 665,431
Int. Cl. G06k 7/10
U.S. Cl. 250—219 11 Claims

ABSTRACT OF THE DISCLOSURE

Apparatus for generating appropriately spaced electrical pulses, including a plurality of cards having suitably arranged apertures, said cards being stored in a stack, solenoid-controlled means for moving a selected card to a display position, a light source which causes beams of light to shine through the card apertures toward a set of photocells, and an opaque screen having windows which serve to pass light intermittently to the photocells upon rotation of the screen, to produce pulsed signals in a sequence corresponding to the arrangement of the card apertures.

This invention relates to control means for systems that convert information into graphical form and more particularly to systems employing photoelectric means for converting programmed instructions into appropriately timed electrical signals constituting commands for a controlled information-displaying device.

The adaptation of optical projector techniques to electro-mechanical plotters described in U.S. Patent 2,859,659 to Donald M. Fenske et al results in a device having numerous advantages in its capacity to automatically collect qualitative or quantitative data and rapidly plot the same to permit visual observations of data concerning magnitudes, trends, movements, behavior patterns, etc., as the data are being generated. The technique employed is one which uses a marking instrument to automatically produce a historical record on some medium which will provide a visual, and usually permanent, record. In such a system a marking instrument is positioned with respect to a coordinate system having two input data references which may be either analog or digital in nature. When the input references change with time, the resultant trace of the marking instrument provides a line record. For example, if the input data are continuous and indicative of the position coordinates of a moving vehicle, the resultant line record represents the traced movements of that vehicle.

Line information of the type referred to can provide valuable information concerning position, route traveled, behavior, etc., of the object beig observed, but such line information is not usually satisfactory for identification purposes. There is accordingly a need for labeling the record so that it is permanently identified and can be indexed, retrieved from storage, etc. For example, there is frequently a need to write alpha-numeric characters on a record so as to give it a title, record the date and time, assign an identification number, classify the subject matter, etc. To at least partially satisfy this need, there do exist recording devices to imprint characters one at a time, such devices being analogous to those used in printing stock market tapes, etc. Since the cost and size of teletypewriter-type printing devices preclude their use in many forms of recording equipment, alternative techniques have sometimes been employed which use the same working instrument to label a record as is used to inscribe the time-varying data. In these instances, the character-egenerating equipment which is required to generate the 80 or more separate $x$ and $y$ coordinates that are employed to inscribe 40 or so alpha-numeric characters, is itself characterized by relatively bulky size, complex circuitry, and high cost.

Accordingly, it is a major object of this invention to provide an economical device which is capable of generating on command the electrical signals required to cause a marking device to follow a desired path.

Another object is to provide a character-generator which is relatively small and simple in design.

Another object is to provide a device responsive to a digital code for depicting programmed information in graphical form.

A further object is to provide an electro-optical means for converting a command in digital code into a series of electrical pulses for driving a marking element to describe a symbol, character, or shape.

Yet another object is to provide a device for scribing diversely sized symbols from a minimum number of command inputs.

A still further object is to provide an information display system in which previously programmed information can be intermixed with currently generated information.

Still another object is to provide a device for inscribing words on a slide while the slide is in a projector and in viewing position.

An additional object is to provide permanent and automatic identification of the information recorded on a slide.

Other objects and advantages will be apparent from the specification and claims and from the accompanying drawing illustrative of the invention.

Figure 1:
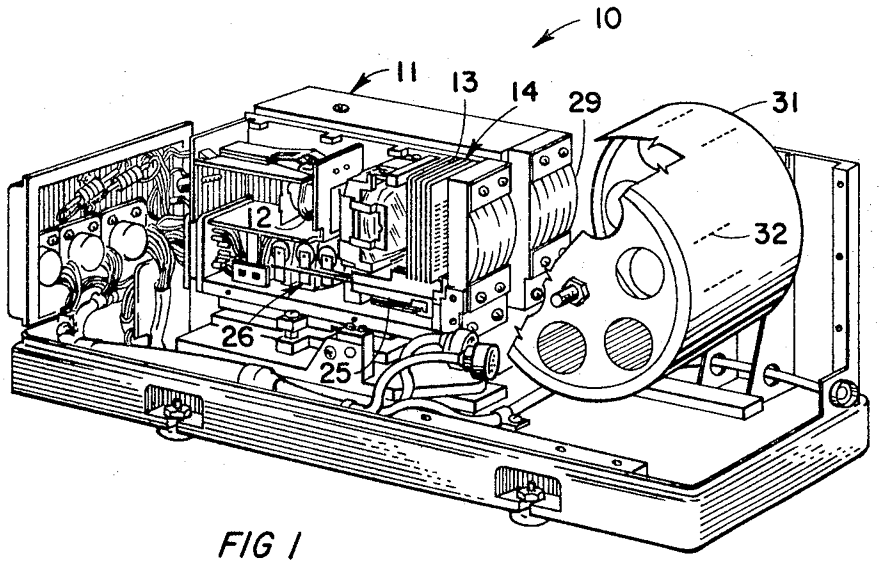
FIG. 1 is a perspective view, partially cut away, of a signal-generating apparatus of the present invention.

With initial reference to FIG. 1, the invention comprises an apparatus 10 for generating movement and marking signals to control a device for depicting information in graphical form, sometimes known as a symbol or pre-programmed data generator. The apparatus 10 includes at least one illumination unit 11, including a source of light 12, and usually a plurality of opaque cards or character plates 13 arranged in a card stack 14 in front of the source of light. Each of the cards 13 has programmed instructions recorded thereon in the form of a plurality of suitably arranged instruction apertures.

Figure 2:
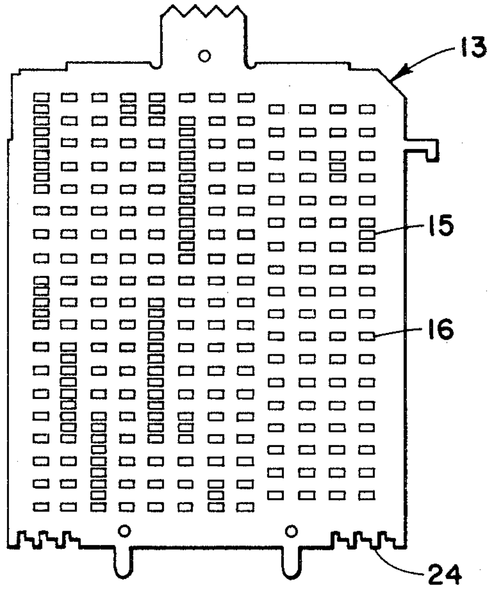
FIG. 2 is a front view of a representative character plate employed in the apparatus shown in FIG. 1.

With additional reference to FIG. 2, the plurality of instruction apertures 15 are orderly arranged in a columnar manner and interposed with inspection apertures 16 in a manner that will be subsequently explained.

Figure 3:
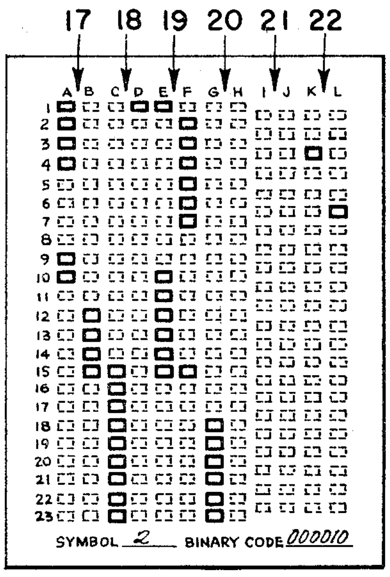
FIG. 3 is a work sheet for a representative character plate.

The disposition of the instruction apertures 15 is best described without regard to the presence of the inspection apertures 16; accordingly, further reference is made to FIG. 3, which represents a worksheet or outline for planning a given card 13, and which shows by broken lines, all of the possible locations for instruction apertures, while the locations for actual apertures are shown by solid lines. Such a worksheet is analogous to a blueprint or engineering drawing, its main purpose being to serve as a means of indicating the spatial relationship of actual apertures 15 as they would appear on a card 13. The worksheet represents an exemplary card which contains 23 possible aperture locations per column. The format distance (defined as the height of a column from the top location to the bottom location) is approximately 1⅛ inches in an exemplary card when the apertures are 0.020 inch in height. Twelve columns of possible aperture locations on the worksheet are lettered A through L, and each horizontal row of locations is numbered with arabic numerals for convenience in identifying a particular aperture location. The columns of aperture locations are segregated into at least five sets 17, 18, 19, 20, 22 with a preferred embodiment having a sixth set 21 as shown in FIG. 3, the sixth set (as well as any other additional set) merely adding versatility to the system by making it possible to incorporate more information, i.e., instructions, on a given card. As illustrated, each of the six sets of aperture locations 17–22 comprise pairs of columns, i.e., A and B, C and D, E and F, G and H, I and J, and K and L. The sets may, however, consist of only single rather than multiple columns. The apertures 15 in a respective set function as will be more fully described by passing light from the source of light 12 to a suitable sensing means (to be described), whereby electrical signals are generated which constitute instructions for controlling a device for portraying information in graphical form; such a device may, for example, dictate the movement of a tracing element or scribe 23 (FIG. 6) as it traverses a desired path. The motions of the scribe 23 are usually in a generally planar mode, and four groups of the apertures 15 convey the instructions or inputs required to move the scribe in the directions of $+x$, $-x$, $+y$, and $-y$, or north, south, east and west, etc. to depict recorded information in graphical form, e.g., to define a programmed symbol or figure. Usually the symbol is generated on a surface by producing a trace that is either darker or lighter than its background, and thus provision must be made for disengaging the scribe or stylus 23 from the surface during those portions of its movement across the surface that marking is not desired. The required, fifth group of apertures 15, comprising apertures in set 22 (columns K and L), provides instructions for plotting as to engaging and disengaging the scribe 23 with respect to the surface.

Having introduced briefly the function of the instruction apertures 15, further description of their placement as indicated on the worksheet (FIG. 3) is appropriate. The first group of apertures located in the set 17 consisting of columns A and B are equal in quantity and spacing to the number and timing of the electrical pulses required to cause the scribe 23 to move in one direction in generating the desired symbol, for example, the $+y$ direction. Similarly, the second group of apertures located in the set 18 consisting of columns C and D are those apertures which depict instructions for scribe movements in the $-y$ direction; the third and fourth groups of apertures (in sets 19, 20) respectively allow light to pass therethrough in a pattern depicting instructions for necessary scribe movements in the $+x$ and $-x$ directions. The remaining group of apertures, comprising those in set 21, provides an additional variable in the generation of symbols in an analog system; in a preferred embodiment, this last group of apertures provides a multiplication factor in the motions of the scribe 23 whereby symbols of diverse size may be generated from a single card, necessitating only a minimum number of command inputs for a great array of possible symbols.

Figure 8:
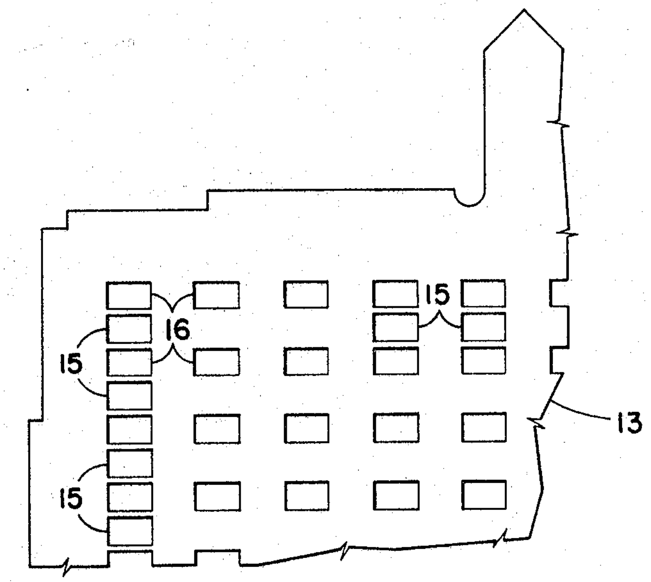
FIG. 8 is an enlarged portion of the character plate shown in FIG. 2.

Referring to FIG. 8, the inspection apertures 16 comprise a plurality of uniformly distributed apertures arranged substantially in a checkerboard pattern, with the distance between vertically and horizontally adjacent inspection apertures being at least as great as, but not much more than, the height and width of instruction apertures 15. The instruction apertures 15 are commingled with and staggered from the inspection apertures 16 such that material between vertically adjacent inspection apertures is almost all removed by an instruction aperture which is interposed therebetween, leaving only very thin strips of card material to hold the card 13 together.

Near one edge of the card 13 is a code or signature means 24 (FIG. 2) for identifying each of the plurality of cards such that a single card may be selected from a card stack 14. The signature 24 preferably comprises a plurality of suitably spaced and formed notches, with selection of a desired one of the cards 13 being accomplished with a previously known technique of positioning a plurality of selector blades 25 (FIG. 4) in such a way that only one card has all of its notches aligned with all of the blades and can accordingly be displaced with respect to the remainder of the stack 14.

The selector blades 25 comprise a part of a card selecting means 26 for moving any selected one of the cards 13 relative to the remainder of the card stack 14 to a display position, such a position being a location where light from the light source 12 passes only through the instruction apertures 15 of the selected card as well as those inspection apertures of other cards which are in register with the instruction apertures of the selected card. The opaque portions of the selected card block off light that otherwise would pass through the card stack 14 through the remainder of the inspection apertures 16. The checkerboard pattern of the inspection apertures 16 would admit of movement of any selected one of the cards 13 either vertically or horizontally to a display position; a preferred embodiment, however, produces displacement of a selected one of the cards 13 downward with respect to the remainder of stack 14 to its display position. Those cards in the stack 14 which do not have all of their notches suitably aligned are supported by one or more of the blades such that they are held in an upper or stored position.

The card selecting means 26 preferably comprises an electromagnetic operating means such as solenoid input coils responsive to digital code, such that the apparatus 10 may be integrated into a computer or other device for establishing the requirements for a programmed symbol. The speed of response of a single selecting means may be conveniently reduceable only to, for example, about 25 milliseconds, while a desirable symbol generating speed of the apparatus 10 may dictate symbol generation in some fraction of that time. The time period required to change a card 13, i.e., return a used card back into alignment with the other cards in the stack 14 and move a new card into display position, is normally about the same as the time period required to scan the light pattern of a card in display position. Accordingly, it has been found expedient to provide more than one illumination unit 11, with two such units being shown side-by-side in FIG. 1. It follows that an apparatus 10 having at least two illumination units 11 will have a first card stack 14 and at least one additional card stack, with each stack being positioned to receive light from a light source 12.

The source of light 12 may be a uniform source, or, as shown, it may more conveniently comprise a light bulb which constitutes approximately a point source of light. When a point source is employed, a collimating lens 27 (FIG. 4) is interposed between the source of light 12 and a card stack 14 and is oriented for directing light from the source through the card apertures 15, 16.

Figure 5:
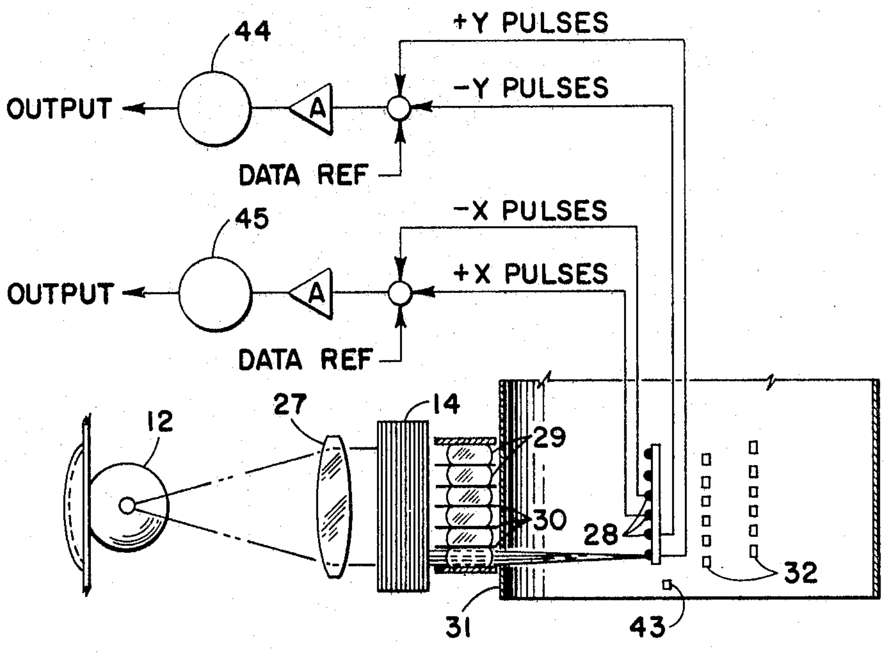
FIG. 5 is a top view in longitudinal section of a part of the apparatus shown in FIG. 1.

A plurality of photocells 28 consisting of one for each of the groups of instruction apertures 15 is positioned at the end of the card stack 14 opposite the source of light 12, such that light from the source which passes through the card stack will impinge on the photocells. To this end, means for focusing light, such as a plurality of convex lenses 29, including at least one lens for each of the groups of card apertures, is interposed between the card stack 14 and the photocells 28, and each of the photocells is respectively located approximately at the focal point of one of the convex lenses. As shown in FIG. 5, the photocells are positioned such that collimated light passing through the apertures of a card in display position, i.e., passing through the card stack 14, enters a respective one of the lenses 29 and exits from the same to converge onto a respective photocell 28. Light shields 30 are advantageously employed between adjacent lenses 29 to preclude the possibility of any scattered light from one group of apertures 15 being focused on any photocell 28 except the intended cell directly in line therewith, whereby erroneous signals from adjacent groups of apertures are prevented.

The photocells 28 are appropriately connected to a device to be controlled, which, for illustrative purposes, is represented as a plotting apparatus 33 and described in more detail hereinafter. The photocells 28 aligned with the $+y$ and $-y$ apertures are connected in this case to drive servomotor 44 and those aligned with $+x$ and $-x$ apertures are connected to drive servomotor 45. The purpose of these connection will be understood when the apparatus 33 is more completely described hereinafter.

When a desired card 13 is in display position, light passes through all the instruction apertures 15 of that card simultaneosuly; consequently, a screening means 31 is employed to perform a scanning function by intermittently permitting light from consecutive ones of a group of apertures 15 to impinge on respective photocells 28. The sceening means 31, which is analogous to a shutter, preferably comprises a rotatable, opaque sleeve having at least one window or slit 32 for admitting light passing through the card stack 14 to the interior of the sleeve during each revolution of the sleeve. A preferred construction of the sleeve 31 includes one small window 32 for each column of apertures 15, i.e., two windows 32 for each of the groups of card apertures rather than, for example, one long window which would accommodate light from all of the groups of apertures; each of the small windows is rotatable into alignment with a respective one of the columns of card apertures and a respective photocell.

When two or more illumination units 11 are employed, the windows 32 are segregated into sets comprising at least one set for each illumination unit. The windows in a set are normally disposed in a line or lines parallel to the longitudinal axis of the sleeve, although disposition along a helix can advantageously provide built-in time delays for certain applications. Another way of providing built-in time delay is to stairstep the positions of the instruction apertures 15. For example, as shown in FIG. 3, the apertures 15 in sets 21, 22 are spaced downwardly with respect to the other sets 17, 18, 19, 20, such that a vertical sweeping pattern will cause row 1 signals in sets 21, 22 to be read a fraction of a second after row 1 signals in sets 17, 18, 19, 20. In such an embodiment, the inspection apertures 16 for sets 21, 22 are similarly spaced downwardly on the card with respect to the inspection apertures in other columns.

The use of a rotating sleeve or drum 31 rather than a tape (because a tape would be more difficult to control in such matters as speed, alignment, etc.) imposes the attendant requirement that the sleeve be as large as conveniently possible, such that the windows 32 in a set sweep across the face of a card 13 at what approximate a constant speed. The large size of the sleeve 31 is not a liability, however, for it makes it practicable to include more than one set of windows 32 for each illumination unit 11. For example, in a sleeve 31 having a diameter of 4½ inches, three sets of windows 32 for a single illumination unit 11 are efficiently employed by spacing them uniformly around the preiphery of the sleeve.

An embodiment having two illumination units 11, most conveniently has the units arranged side-by-side, and similarly oriented; in such an embodiment, the sets of windows 32 for one illumination unit are staggered (i.e., peripherally spaced about the sleeve) with respect to the sets for the other unit such that light from only one unit is admissible to the interior of the sleeve 31 at a given time.

A means such as an electric motor (not shown) is provided for rotating the sleeve 31, whereby the light rays passing through the apertures of a card 13 in display position are sequentially interrupted by the opaque portions of the sleeve. The series of electrical pulses generated by the photoelectric cells 28 because of these interruptions in incident light, being derived from a card, are thus correlated to the programmed instruction on that card.

A means having been described for generating electrical pulses which are correlated to the information recorded on cards 13 in the form of suitably arranged apertures 15, there is combined therewith an apparatus for utilizing said electrical pulses comprising an apparatus for depicting information in graphical form. An exemplary apparatus is described in the aforementioned patent to Fenske et al., 2,859,659, although it will be recognized that other data plotting, indicating or tracing devices can be advantageously combined with the signal generating means 10. For example, the apparatus 10 may be employed to feed control signals to a cathode ray tube; similarly, a laser beam may be caused to follow a programmed path in accordance with electrical pulses generated by the appartus.

Figure 6:
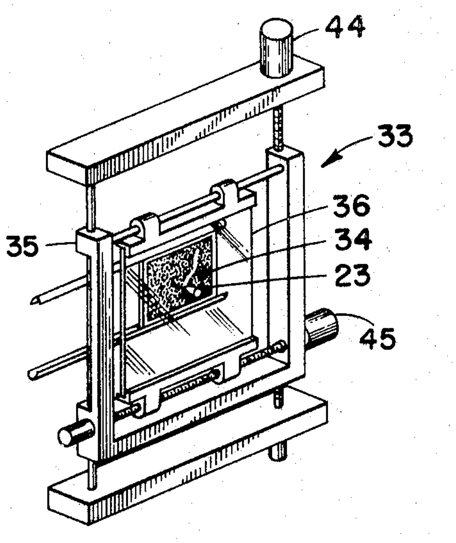
FIG. 6 is a partially diagrammatic view of an exemplary plotting apparatus.

A simplified version of plotting apparatus 33 is shown in FIG. 6 which includes a stylus or scribe 23, a surface 34 on which the stylus bears for depicting information in graphical form, and an $x$-$y$ mechanism 35 for changing the relative position between the stylus and any given point within the area of the surface in response to the series of electrical pulses generated by the photocells 28. The mechanism 35 includes a movable frame 36 carrying the stylus 23, and first and second servomotors 44, 45 for altering the position of the movable frame with respect to a stationary plotting surface 34. The use of an aimable laser beam to burn a trace on the opaque surface of a slide is an advantageous alternative to mechanically scratching such a trace on a slide, i.e., advantageous in that the $x$-$y$ mechanism can be completely eliminated. A mechanism which is not illustrated is employed to bring the stylus 23 into engagement with the surface 34 as desired.

An end-of-symbol device 40 (FIG. 4) is advantaegously employed to prevent repetitive displays of the same character (unless repetitions are actually required), comprising a source of light 41 on a given side of the drum 31, a photocell 42 on the opposite side of the drum in register with the light source 41 and adapted to receive light from the light source, and one or more apertures 43 in the opaque drum which pass between the light source and the photocell during each revolution. Also included in the device 40 is a relay 46 connected to the photocell 42 which trips upon the completion of a given symbol and does not pass subsequent electrical signals generated by the photocells 28 on to the plotting apparatus 33 unless it is overridden.

In operation of the invention, the requirement for a character (or series of characters, symbols, etc.) is established and fed into the apparatus 10 in the form of binary or teletype code. A binary code up to six bits provides sixty-four separate combinations for the electromagnetic card selecting means 26. By suitable arrangement of the selector blades 25 through signal input (bit) coils, a single card 13 having the appropriate card signature 24 will be aligned with the selector blades such that it can be displaced with respect to the remainder of the card stack 14 to a display position.

For exemplary purposes, it will be assumed that it is desired to generate initially the number "2" and subsequently the letter "A". The card 13 in a first unit 11 having instructions recorded thereon for generating the numeral "2" is selected and moved to the display position. The light from light source 12 passes through the collimating lens 27 and all of the inspection apertures 16 of all of the cards 13 in front of the selected card. Upon reaching the selected card 13, a large portion of the light is blocked by the opaque portions of said card, while the instruction apertures 15 of the selected card are aligned with the inspection apertures 16 of all the other cards in the stack 14. Thus, a controlled amount of the light is allowed to pass completely through the stack 14 in a pattern corresponding to the instruction apertures 15 of the selected card 13.

Figure 4:
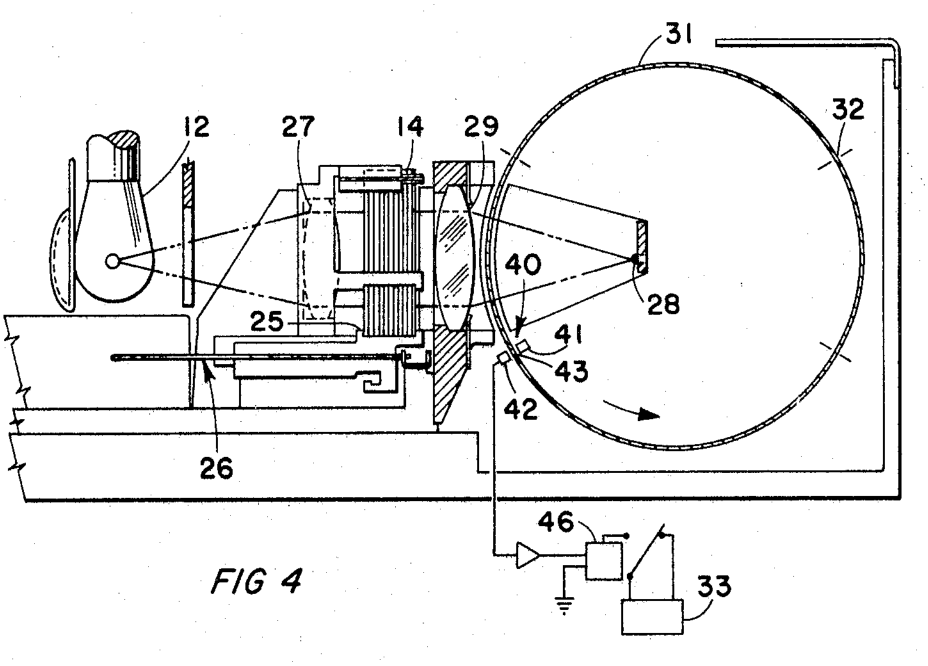
FIG. 4 is a side view in longitudinal section of a part of the apparatus shown in FIG. 1.

Light passing through the stack 14 is focused by the lenses 29, in the absence of any light interrupting means (such as screen 31), onto respective photocells 28. The screening means 31, however, blocks off the light which has passed through the stack 14 except when, during rotation the windows 32 allow whatever light is present to impinge briefly on the respective photocells as the windows move into alignment between the light rays and respective photocells. The sleeve 431 rotates counterclockwise as seen in FIG. 4, such that light passing through the top aptrtures 15 will first impinge on the photocells, sending a pulse or pulses to, for example, the plotting apparatus 33.

The stylus 23 of the plotting apparatus 33 is kept at a null or zero position until signals are received from the photocells 28 dictating the required movements, said movements being effected by use of the appropriate servomotors 44, 45. It will be apparent to those skilled in the art that this can be accomplished in any of several ways, including, for example, by accumulation of incremental steps in bi-directional stepping motors; or, it can be effected by accumulation of signal increments in a bi-directional counter or an analog integrator, and converting the output into a suitable voltage for driving the servomotors 44, 45. Since very few letters and numerals in a representative alpha-numeric set of 36 characters have the same starting place to initiate a trace, the first few signals sent to the apparatus 33 are normally only movement signals, with the stylus 23 being disengaged from the surface 34, i.e., being out of plot. In the case of the arbitrarily selected null position shown in FIG. 7, it will be seen that stylus movements of one $+x$ and three $+y$ units (represented by the broken line 37) are made before the signal to go into plot causes the stylus 23 to engage the surface 34.

The card 13 in display position for generating the figure "2" has instruction apertures 15 spaced like those in FIG. 3, and accordingly FIG. 3 will be examined for convenience as if it were the actual card. As the sleeve 31 begins to rotate, the first row of six windows 32 which are capable of alignment with aperture locations in columns A, C, E, G, I and K on the card 13 will first be aligned with the apertures in row 1. Since only columns A and E actually have apertures through which light is passing, electrical signals will be generated only by the two photocells 28 aligned with those two columns, resulting in a $+y$ and a $+x$ pulse. As the sleeve rotates further, the windows 32 move out of alignment with the apertures of row 1 and into alignment with the aperture locations of row 2, where only column A has an aperture, resulting in a single $+y$ pulse.

The sleeve 31 continues to rotate, thus bringing the first set of windows 32 into successive alignment with all of the apertures 15 of columns A, C, E, G, I and K. As the sleeve 31 rotates further, a second set of six horizontal windows 32 to the right of and peripherally spaced from the first set of windows 32 moves into alignment with row 1 of the aperture locations in columns B, D, F, and H, and shortly thereafter the aperture locations of columns J and L. Eventually, a window will have passed between each aperture 15 and its respective photocell 28, whereby an electrical signal will have been generated in response to light passing through each of the instruction apertures.

Figure 7:
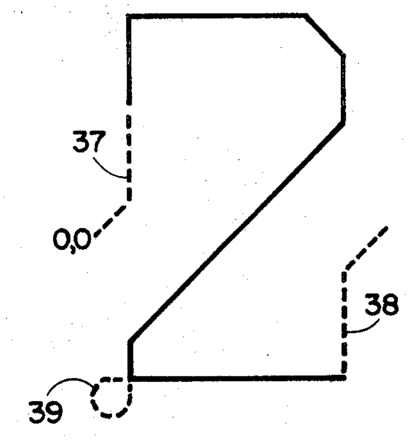
FIG. 7 is a view of an exemplary numeral such as could be drawn by a plotting apparatus in conjunction with the present invention.

Referring again to the exemplary stylus 23, it remains in contact with the surface 34 as it responds to the $x$ and $y$ inputs which result in the figure "2" being traced on the surface 34. The corners of the numeral in FIG. 7 are illustrated as sharp and precise, although this sharpness is not usually obtainable nor always desirable. If $+x$ and $+y$ command signals are given to a moving stylus 23 at nearly the same time, the plotter 33 will tend to integrate the two signals and the stylus will follow an arcuate path rather than a straight line in arriving at the new position. This integrating characteristic can contribute to the generation of symbols with rounded corners such that they present a smooth, flowing appearance in spite of what may be a relatively coarse grid size. Integration is a function of the response of the plotter, however, and the lag in response time (between the time a signal is generated and the time the stylus responds thereto) must be known before a symbol can be optimally programmed for a particular plotter. It can be generally said, however, that a plotter having a relatively slow response time will be more amenable to integration techniques for producing a smooth trace, i.e., a trace showing no perceptible jerking movements of the stylus, than will a plotter characterized as having a relatively rapid response time.

If it is desired to produce a truly sharp angle in a symbol, it may be necessary to take the stylus out of plot for a brief period, describe a loop to thereby change the direction of movement of the stylus, and then re-engage the stylus as it passes through the point where the trace was previously interrupted. Such a direction-changing loop is shown for the purposes of illustration in FIG. 7 by the broken line 39, although the instructions necessary to accomplish this loop are omitted from FIG. 3.

The symbol "2" terminates at the bottom, right-hand corner of FIG. 7 at the end of the solid line, with the broken line 38 adjacent thereto again representing out-of-plot movement of the stylus. FIG. 3 shows twenty-three possible aperture locations per column and two columns per group; thus, there are forty-six possible input signals per group in this example. Accordingly, by the end of the forty-sixth signal, the stylus should be back at a selected null position ready to begin a subsequent character or symbol. If the stylus is not back at a known null position, it would be practically impossible to program a series of symbols and generate them along a horizontal line; for a person would never know what movement commands to provide for a second symbol if the starting location were not known, and the starting location for a second is inherently the terminal location for a first symbol. If the number of possible apertures were increased, for example, by adding a third column of possible aperture locations per group, etc., the grid upon which stylus movements are plotted could be correspondingly reduced, such that a character or symbol having improved shape definition could be delineated.

Stylus movements to form the numeral "2" having been described, the next character, e.g., the letter "A," would then be defined by the stylus, the location of the stylus, as to elevation, being the same preparatory to inscribing an "A" as the beginning point for the "2." Just as the letter "W" requires greater width than an "I" in a typed word, it is convenient with the apparatus 10 to employ a variable amount of width, as appropriate, in defining a character with the stylus 23 to present a balanced word or line. In an analog system, it is even possible to rectify the lengths of lines of narrative matter with the apparatus 10, using techniques not described herein but analogous to those used in automatic type-setters. Such an analog system can thus produce an almost infinite number of diversely sized characters with only a basic series of command inputs from a card 13 plus a desired multiplication factor or factors.

While the card 13 in the first illumination unit 11 is being scanned by the rotating drum 31, the second illumination unit in response to a command will have moved the card 13 having instructions thereon for forming the character "A" into display position. Having completed the numeral "2," the apparatus 10 then is ready to generate the electrical signals for forming the desired "A."

Switching from a first to a second illumination unit 11 is conveniently accomplished mechanically with the sleeve 31 by virtue of selective location of a further set of windows 32, the second set being spaced peripherally and axially about the sleeve with respect to the windows for the first illumination unit. When a given one of the illumination units 11 is being scanned, that portion of the sleeve 31 which is in register with the other illumination unit is completely opaque, such that only one unit can provide signals to a display apparatus, e.g., plotting apparatus 33, at a given time. An optional feature (not shown) is an additional shutter between the card stack 14 and the convex lenses 29, which operates in conjunction with the card selecting means 26 to preclude light from impinging on any of the photocells 28 during a card-changing cycle.

Shortly after the last instruction signal from the "2" card 13 is generated, and upon slight additional rotation of the opaque screen 31, the end-of-signal aperture 43 corresponding to that set of windows 32 which permitted the "2" light pattern to generate the appropriate electrical pulses passes between the source of light 41 and the photocell 42. The resulting signal generated by light from light source 41 impinging on the photocell 42 causes relay 46 to trip, thereby preventing the plotting apparatus 33 from again forming the numeral "2" (if the "2" card has not been removed) as another set of windows 32 sweeps across the front of the first illumination unit 11. Actuation of the card selecting means 26 to place a new card 13 in display position again closes the signal generating circuit and permits signals generated by the photocells 28 to pass to the plotting apparatus 33.

A single revolution of the drum 31 in the preferred embodiment permits the generation of six characters, signals for three characters being generated by a first or right unit 11 and signals for the other three characters being generated by a second or left unit 11. It will be understood, however, that, apart from the speed of the display apparatus 10 is limited only by the quantity of illumination units 11 which can conveniently be coupled together, either in the vicinity of the display area or another area remote therefrom. All of the information generated by the apparatus 10 is in the nature of electrical pulses, and can be readily integrated into any electrical display system including, if desired, a system simultaneously displaying currently generated information.

While only one embodiment of the invention, together with modifications thereof, has been described in detail herein and shown in the accompanying drawing, it will be evident that various further modifications are possible in the arrangement and construction of its components without departing from thes cope of the invention.

What is claimed is:

1. In combination:

a source of light;

a card having information recorded thereon as suitably arranged apertures, said apertures being segregated into at least five groups;

means for positioning the card in a display position where the apertures of the card permit light from the light source to pass therethrough;

a plurality of photoelectric cells consisting of one for each of the groups of card apertures;

means for focusing the light passing through the apertures of a card in display position onto respective ones of the photoelectric cells;

screening means for selectively allowing light passing through the apertures of said card in display position to impinge on photoelectric cells aligned with said apertures, said screening means being moved with respect to said card, thereby causing light passing through said apertures to scan said photoelectric cells and generate a series of electrical pulses correlated to the information recorded on the card, and apparatus for depicting information in graphical form, comprising a marking device, a surface on which the marking device records information in graphical form, and mechanism for changing the relative position between the marking device and the surface in response to the series of electrical pulses generated by the photoelectric cells.

2. The combination claimed in claim 1 wherein the screening means comprises a rotatable, opaque sleeve having at least one window for admitting light passing through the card to the interior of the sleeve during each revolution of the sleeve, the plurality of photoelectric cells being located interiorly of the sleeve, and further comprising means for rotating the sleeve.

3. The combination claimed in claim 1 wherein each of the five groups of apertures respectively provide a group of inputs to the apparatus for depicting information in graphical form, said input groups consisting of inputs controlling marking device functions of $+x$, $-x$, $+y$, $-y$, and plot.

4. The combination claimed in claim 1 and further including: collimating means interposed between the source of light and the card stack, and oriented for directing light from the source through the card apertures.

5. The combination claimed in claim 1 including a plurality of cards arranged in a card stack, each of the cards having information recorded thereon as suitably arranged apertures, said apertures being segregated into at least five groups, and further including card-selecting means for moving any selected card relative to the remainder of the card stack to a display position where the apertures of the selected card permit light from the light source to pass through the card stack.

6. The combination claimed in claim 5 wherein the card selecting means comprises electromagnetic operating means responsive to digital code.

7. In combination:

a source of light;

a plurality of cards arranged in at least two card stacks consisting of a first card stack and at least one additional card stack, each stack being positioned to receive light from a light source, and each of the cards having information recorded thereon as suitably arranged apertures, the apertures being segregated into ordered groups;

card-selecting means for moving any selected card relative to the remainder of the respective card stack to a display position such that the apertures of the selected card permit light from the light source to pass through the respective card stack;

a plurality of photoelectric cells including at least one photoelectric cell for each of the groups of card apertures;

means for focusing the light passing through a card stack onto respective ones of the photoelectric cells;

shutter means for selectively allowing light passing through apertures in said selected card to impinge on photoelectric cells aligned with said apertures in a sequential manner, thereby causing light passing through the apertures to scan said photoelectric cells and generate a series of electrical pulses correlated to the information recorded on the selected card; and apparatus for depicting information in graphical form, comprising a stylus, a surface on which the stylus bears for depicting information in graphical form, and mechanism for changing the relative position between the stylus and the surface in response to the series of electrical pulses generated by the photoelectric cells.

8. The combination claimed in claim 7 wherein the shutter means comprises an opaque screen having a first window aligned with a first card stack and at least one additional window aligned with the at least one additional card stack, the first and the at least one additional windows being spaced such that only one of said windows permits light to pass from the light source to the photoelectric cells at a given time.

9. The combination claimed in claim 8 wherein the opaque screen is in the form of a sleeve, the sleeve being rotatably mounted, and the plurality of photoelectric cells being located internally of the sleeve.

10. Means for forming a programmed symbol, comprising:

at least two illumination units, each consisting of:

a source of light;

a plurality of cards arranged in a card stack, each of the cards having programmed instructions recorded thereon as columnarly arranged apertures, said apertures being segregated into at least five groups, the groups of apertures respectively depicting instructions for scribe movements in the direction of $+x$, $-x$, $+y$, $-y$, and instructions for plotting;

a collimating lens interposed between the source of light and the card stack and oriented for directing light from the source through the card apertures;

card-selecting means for moving any selected card relative to the remainder of the card stack to a display position where light from the light source passes through the apertures of the selected card and through the remainder of the card stack, said card-selecting means comprising electromagnetic operating means responsive to digital code;

a plurality of convex lenses for converging to respective focal points the light passing through the apertures of a card in display position, including at least one lens for each of the groups of card apertures;

a plurality of photocells consisting of one for each of the groups of card apertures, a respective photocell being located approximately at the focal point of each of the convex lenses;

an opaque sleeve enclosing the plurality of photocells, the sleeve having a plurality of windows including at least one window for each of the groups of card apertures, each of the windows being respectively aligned with a group of card apertures and a respective photocell, the windows being segregated into sets comprising at least one set for each illumination unit, the windows in a set being disposed in a line parallel to the longitudinal axis of the sleeve, the sets of windows being peripherally spaced about the sleeve such that light from only one illumination unit is admissible to the sleeve interior at a given time, and the sleeve being rotatable about the longitudinal axis thereof, whereby the sleeve in rotation performs a scanning function by intermittently permitting light from consecutive apertures in a column of apertures to impinge on a respective photocell causing a series of electrical pulses to be generated which are correlated to the programmed instructions on the card in display position;

means for rotating the sleeve; and plotting apparatus for tracing a symbol comprising a scribe, a surface on which the scribe bears for tracing a symbol, and mechanism for changing the relative position between the scribe and the surface in response to the series of electrical pulses generated by the photocells.

11. A symbol generator, comprising:

a tracing element;

a plurality of cards arranged in a card stack, each of the cards respectively having instructions recorded thereon for directing the movements of the tracing element to describe a given symbol, the instructions comprising a plurality of apertures consecutively spaced in a pattern corresponding to the required vector inputs and plotting signals for causing the tracing element to describe the given symbol;

means for positioning a selected one of the plurality of cards in an inspection position;

electro-optical means for inspecting the selected card upon the same being placed in inspection position and for generating sequential electrical signals correlated to the spaced apertures of the selected card; and means for moving the tracing element in accordance with the electrical signals generated by the electro-optical means, whereby the selected symbol is generated.

References Cited

UNITED STATES PATENTS

| | | | |
|---|---|---|---|
| 2,774,821 | 12/1956 | Brown et al. | 235—61.11 |
| 3,102,995 | 9/1963 | Abbott, et al. | 235—61.11 |
| 3,298,015 | 1/1967 | Herman | 235—61.11 |

ARCHIE R. BORCHELT, Primary Examiner

M. ABRAMSON, Assistant Examiner

U.S. Cl. X.R.

178—18; 346—33